United States Patent [19]
Hohmann et al.

[11] Patent Number: 5,695,314
[45] Date of Patent: Dec. 9, 1997

[54] APPARATUS AND METHOD FOR SINGLING STACKED CARDS

[75] Inventors: Arno Hohmann; Joachim Hoppe, both of Munich, Germany

[73] Assignee: Giesecke & Devrient GmbH, Germany

[21] Appl. No.: 539,872

[22] Filed: Oct. 6, 1995

[30] Foreign Application Priority Data

Oct. 7, 1994 [DE] Germany ............... 44 35 921.7

[51] Int. Cl.⁶ .................................. B65G 59/02
[52] U.S. Cl. ................... 414/796.6; 414/796.7; 414/797; 414/795.7; 271/104
[58] Field of Search ............ 414/796.6, 796.7, 414/797, 795.7, 627; 271/104, 107, 30.1, 152, 155

[56] References Cited

U.S. PATENT DOCUMENTS

| | | |
|---|---|---|
| 1,089,274 | 3/1914 | Sazenhofen ................ 414/797 |
| 3,822,024 | 7/1974 | Endter et al. ............ 414/796.7 |
| 4,013,193 | 3/1977 | Lorsch . | |
| 4,318,539 | 3/1982 | Lamos . | |
| 4,354,787 | 10/1982 | Gensike et al. . | |
| 4,384,710 | 5/1983 | Gustafson ................. 271/104 |
| 4,480,826 | 11/1984 | Kaneko ...................... 271/104 |
| 4,946,341 | 8/1990 | Parsley et al. ........... 414/796.7 |
| 5,048,811 | 9/1991 | Hochbein . | |
| 5,106,260 | 4/1992 | Obrecht . | |

FOREIGN PATENT DOCUMENTS

| | | | |
|---|---|---|---|
| 3124160 | 12/1982 | Germany | 414/796.7 |
| 1375388 | 2/1988 | U.S.S.R. | 271/104 |
| 2 066 219 | 8/1981 | United Kingdom . | |
| 8704141 | 7/1987 | WIPO | 414/796.7 |

Primary Examiner—Karen B. Merritt
Assistant Examiner—Douglas A. Hess
Attorney, Agent, or Firm—Bacon & Thomas

[57] ABSTRACT

An apparatus for singling cards, such as check cards, identity cards and the like, which consists of a magazine for storing the cards in a stack, a removing device and a retaining device. The cards are disposed in the magazine rotated at a defined angle from one another, resulting in protruding surfaces between two successive cards. For singling, the uppermost card is lifted off in an axis perpendicular to the card surface by means of a removing device. The card following the uppermost card is held back in the magazine by means of a retaining device, the retaining device acting on the protruding surface of the following card.

11 Claims, 4 Drawing Sheets

APPARATUS AND METHOD FOR SINGLING STACKED CARDS

BACKGROUND

1. Field of the Invention

This invention relates to an apparatus for singling cards, such as credit cards, check cards and the like.

2. Related Information

Known singling apparatus usually consist of a magazine which houses the card stack. If the card stack is to be processed from the top a removing device is provided for gripping the uppermost card from the magazine and transferring it to a transport system or another further-processing device. Known singling apparatus further have retaining devices for holding back the cards following the uppermost card in the magazine.

Such singling apparatus are known from the prior art. Reference is made in this connection e.g. to DE-OS 38 14 075.

In this print the cards are deposited one on the other in form-fitting fashion in a magazine. The cards are held in the card magazine with the help of a retaining device in the form of a stop located at the upper end of the card magazine. The uppermost card is moved into a singling groove with the help of a removing device, for example a clock-controlled suction head. The uppermost card thereby passes out of the area of the stop retaining the card stack so that the card can then be removed from the stack by the suction head.

If the cards have raised areas, e.g. embossings, it is possible for the card stack to jam in the magazine. Consequently the uppermost card can be disposed diagonally and not be introduced completely into the singling groove, so that disturbances can occur during singling.

The problem underlying the invention is to propose an apparatus for singling cards, such as identity cards, check cards and the like, which improves the reliability of singling and guarantees gentle treatment of the cards.

This problem is solved according to the invention by the features stated in the main claim. Advantageous developments are the object of the subclaims.

BRIEF SUMMARY OF THE INVENTION

The basic idea of the invention is that the cards are rotated at a defined angle from one another when the magazine is filled. This results in protruding surfaces between two successive cards for the retaining device to cooperate with. The uppermost card of the stack is then lifted off the stack vertically by means of a removing device.

The advantages of the inventive solution are, firstly, that the retaining device can act on a relatively large surface so that the following cards are held back simply and reliably. This results in very high reliability of singling. Secondly, since the uppermost card is lifted off the stack vertically the card cannot be damaged e.g. by friction with the following card. Thirdly, the card to be singled does not have to be pressed against stops, as in the prior art, so that diagonally disposed cards can also be easily singled.

According to a preferred embodiment the uppermost card is lifted off the stack by means of a suction head and guided through a disk having an aperture in the form of a diaphragm which is adapted in dimensions and positioning to the uppermost card. If several cards should stick together, the card following the uppermost card is held back by the diaphragm and falls back into the magazine. For singling this card, which is rotated at a defined angle from the uppermost card, the position of the diaphragm is guided to follow the position of this card.

In a further embodiment the retaining device consists of a rectangular plate with columns or feet fastened to the corner points in the form of a bridge in the middle of which there is a vertically movable suction head. For singling, the bridge is first brought into a position in which it spans the uppermost card. The suction head is lowered onto the uppermost card and sucks it up. Relative motion between bridge and suction head now moves the uppermost card into the bridge, the following card being held back by the bridge feet.

According to a further embodiment the retaining device can also consist of diagonally disposed slides which are moved in above the magazine to act on the protruding surfaces of the following card, thereby holding back the following card when the uppermost card is lifted off by the suction head.

The above-described embodiments can of course also be used for card groups consisting of a number of cards disposed in the card magazine at the same angle, i.e. in form-fitting fashion, but rotated from one another. One need only replace the suction head by a suitable gripper designed so as to grasp the uppermost card group and transfer it to a further-processing unit. The retaining device acts on the protruding surfaces of the next card group.

In a development of the invention it is also possible to adjust the height of the card stack in the card magazine by a card elevator controlled by means of a height sensor consisting of two light barriers.

It is further possible to deposit individual cards or card groups automatically by means of suitable stacking apparatus so that they are rotated at a defined angle from one another.

BRIEF DESCRIPTION OF THE DRAWINGS

In the following some embodiments of the invention will be described with reference to the figures, in which.

DETAILED DESCRIPTION OF PREFERRED EMBODIMENTS

Figure 1:
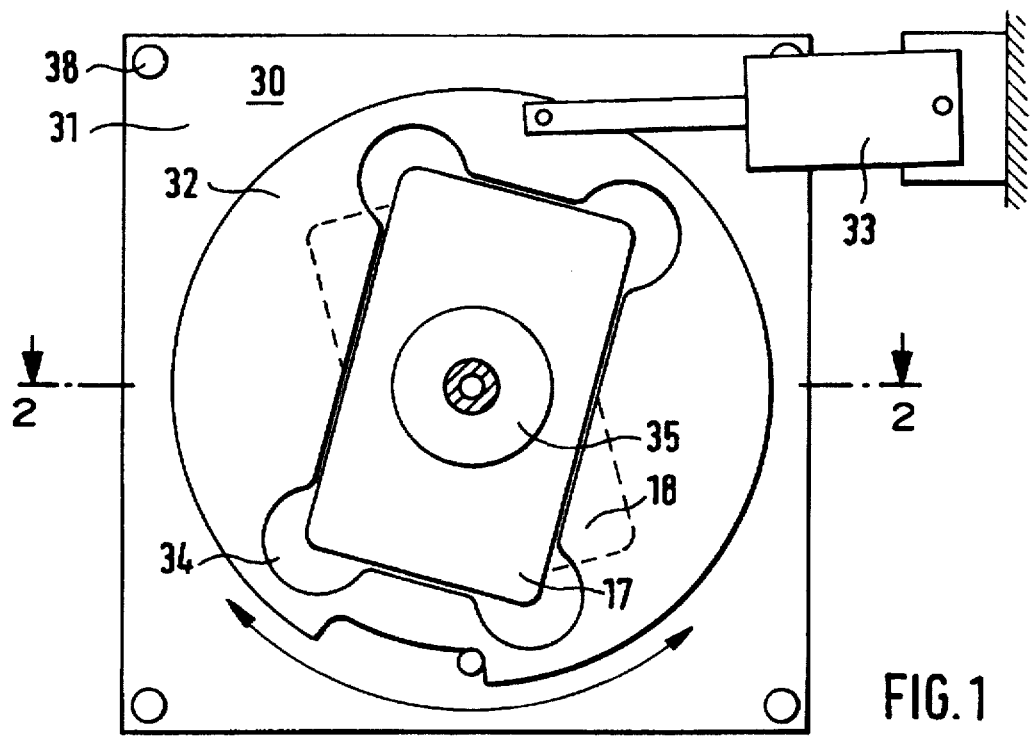
FIG. 1 shows a plan view of a singling apparatus with a diaphragm as a retaining device.
Figure 2:
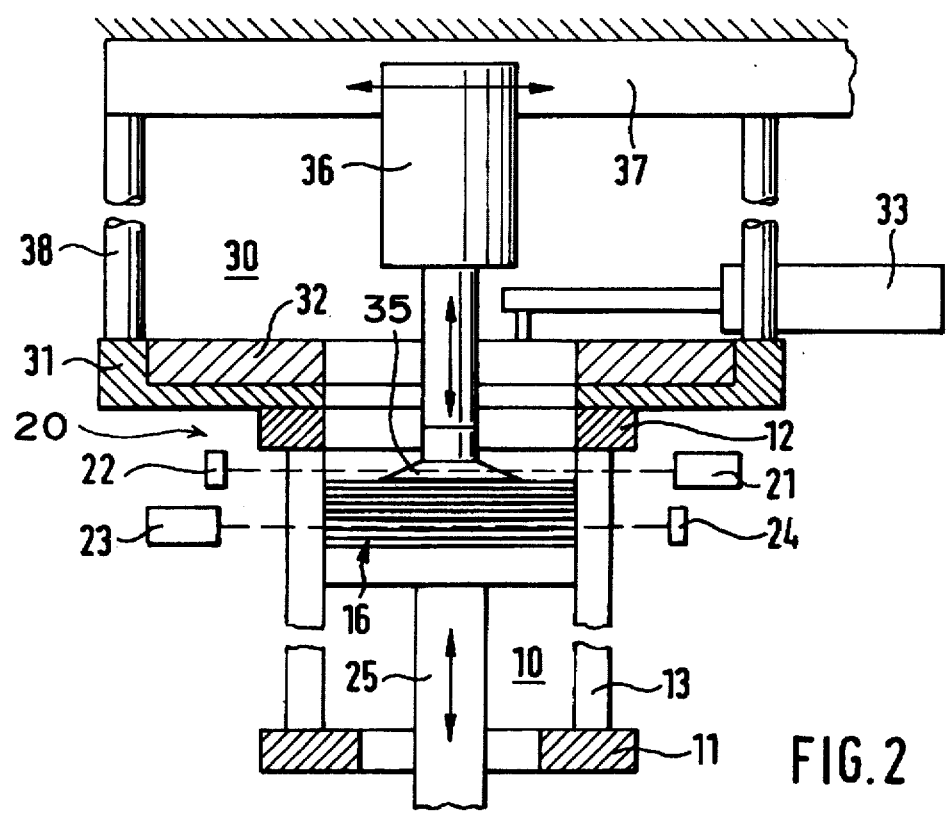
FIG. 2 shows a side view of the singling apparatus in FIG. 1, FIGS. 3 and 4 show different embodiments of the card magazine.

Singler 30 schematically shown in FIGS. 1 and 2 consists of bottom 31 in which card retainer or diaphragm 32 is rotatably mounted. Diaphragm 32 can be moved by means of swiveling cylinder 33. Diaphragm 32 is provided with aperture 34 corresponding substantially to the shape of the card to be singled.

The removing device in this embodiment comprises suction head 35 which can be moved up and down by means of lifting cylinder 36 along an axis perpendicular to the card surface. Linear guide 37 is fastened to singler bottom 31 with rod assembly 38 and serves to move suction head 35 including lifting cylinder 36 back and forth in a plane parallel to the card surface.

Singler 30 is located above card magazine 10. Card magazine 10 consists of bottom 11, cover 12 and walls 13. Within card magazine 10 there is card stack 16 from which cards are singled by means of the suction head. The cards of stack 16 are deposited rotated from one another so that protruding surfaces 17a form between two successive cards 17, 18, each of which has opposed major generally planar surfaces 17b defined by surface parameters 17c.

To permit card stack 16 to be positioned exactly in card magazine 10, height regulator or card presence sensor system 20 is provided. This consists of two light beam/detectors, the first consisting of light beam transmitter 21 and light beam receiver or detector 22 and the second of transmitter 23 and receiver 24. Under card stack 16 there is card elevator 25 which can be controlled with the help of the signals from the two light beam systems so that the upper edge of card stack 16 is always located at a defined height between the light beam systems.

Before the actual singling of uppermost card 17 from card stack 16, stack 16 is positioned by means of card elevator 25 so that uppermost card 17 of stack 16 is located below the upper light beam/detector 21, 22 and above the lower light beam/detector 23, 24. If both light beam systems indicate "dark" in the initial state, stack 16 is too high and must be lowered by card elevator 25 until the upper light detector indicates "light". If both light beam systems indicate "light", the stack is too low and must be lifted with card elevator 25 until the lower light beam detector indicates "dark". In the final state the upper light beam detector thus indicates "light" and the lower light beam detector "dark" and uppermost card 17 is located between the upper and lower light beams.

For singling uppermost card 17, diaphragm 32 is brought with the help of swiveling cylinder 33 into a position in which aperture 34 is form-fitting with respect to uppermost card 17 (FIG. 1) so that there is free access to uppermost card 17. A card removing device comprising a suction head 35 can now be moved through aperture 34 by means of lifting cylinder 36 until it comes in contact with uppermost card 17 and sucks it up. A lifting actuator or cylinder 36 constituting part of the card removing device causes suction head 35 with uppermost card 17 to be lifted vertically off following card 18 and singled through aperture 34.

If following card 18 should stick to uppermost card 17 due to dirt or electrostatic charge, it is held back by diaphragm 32 upon engagement with diaphram 32. Diaphragm 32 acts here on the protruding surfaces of following card 18. This guarantees that only uppermost card 17 can be singled through aperture 34. Cooperation of linear guide 37 and lifting cylinder 36 now permits uppermost card 17 to be fed to a further-processing unit.

Figure 3:
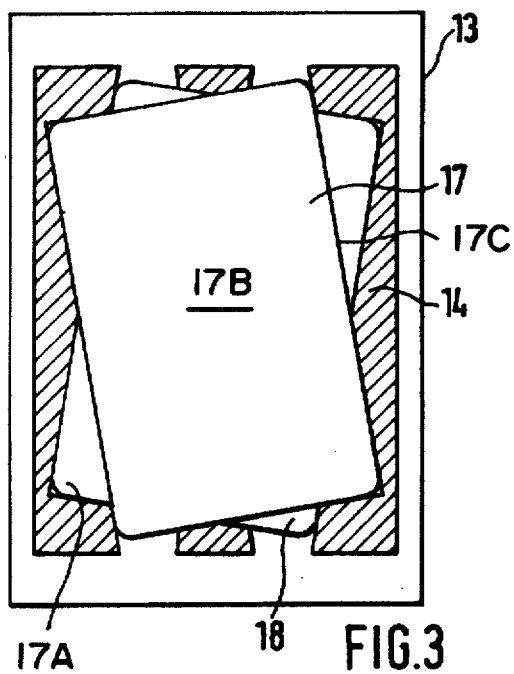
Figure 4:
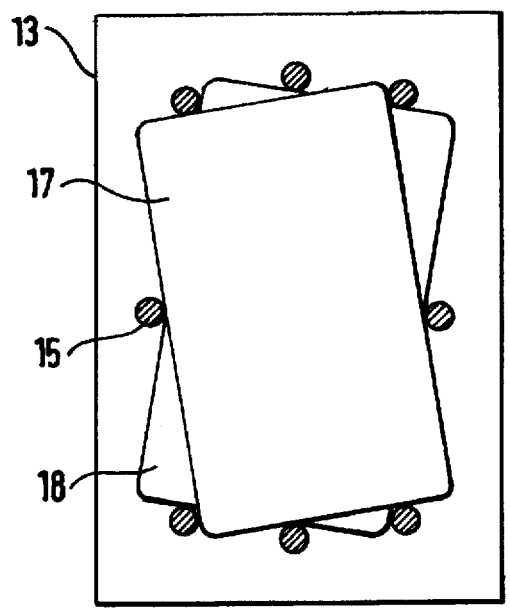

FIGS. 3 and 4 show different embodiments of card magazine 10. For faultless singling it is necessary that the cards be disposed in the card magazine rotated from one another. To fix the cards in these positions different fixing means are provided in card magazine 10. FIG. 3 shows fixing frame 14 in which grooves or recesses are provided so as to guarantee a positionally fixed arrangement of the cards in two positions. FIG. 4 shows an embodiment in which the fixing means consist of fixing rod assembly or array 15. Fixing rod assembly 15 performs the same functions as fixing frame 14 but constitutes a more cost-effective variant.

Figure 5:
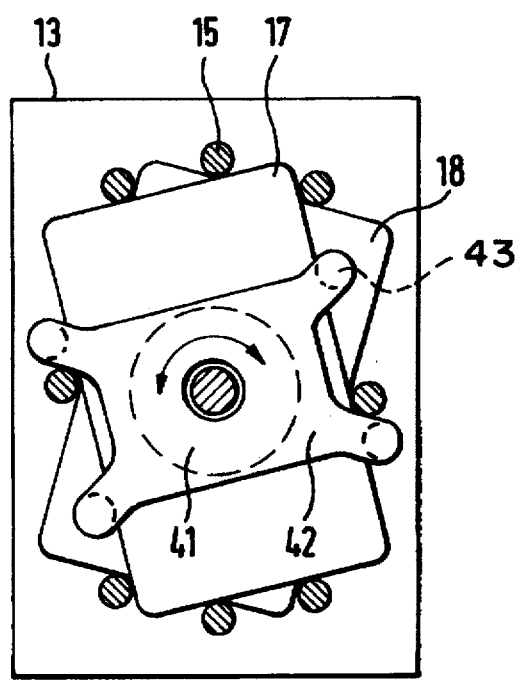
FIG. 5 shows a plan view of a singling apparatus with a bridge.
Figure 6:
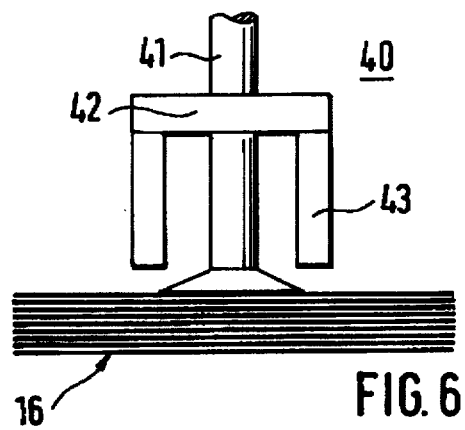
FIGS. 6 and 7 show a side view of the singling apparatus in FIG. 2.
Figure 7:
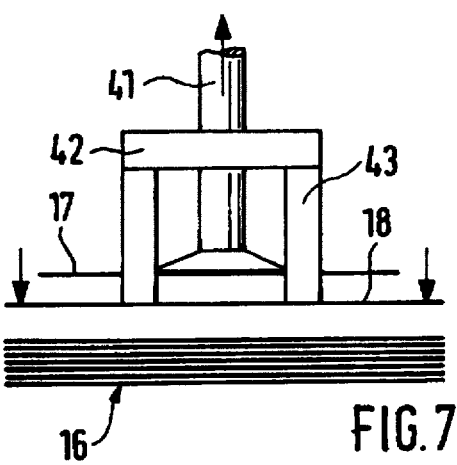

FIGS. 5 to 7 show a further embodiment of a singler. Singler 40 shown here consists of bridge 42 with an array of four feet 43 spanning uppermost card 17. In the middle bridge 42 is fastened to rotatable suction head 41 which can be moved according to the first embodiment, for example. For singling, bridge 42 is rotated above card magazine 10 so that it spans uppermost card 17.

FIG. 6 shows in a side view how suction head 41 is placed on uppermost card 17 and sucks it up. Bridge 42 is above card stack 16. For actual singling, suction head 41 is moved upward relative to bridge 42, as shown in FIG. 7, so that uppermost card 17 passes between bridge feet 43.

If following card 18 should stick to uppermost card 17, bridge feet 43 press on the protruding surfaces of following card 18 so that the latter is separated from uppermost card 17 and falls back into the magazine. Singled uppermost card 17 can now be transferred to a further-processing unit according to the first embodiment for example.

Figure 8:
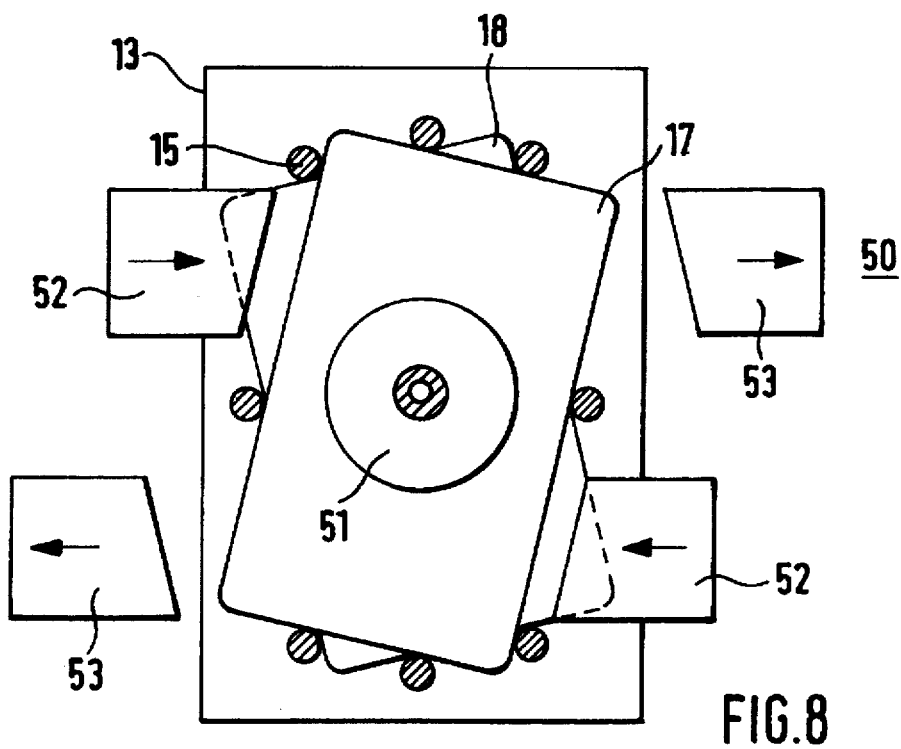
FIG. 8 shows a plan view of a singling apparatus with turning pairs as a retaining device.

FIG. 8 shows a further embodiment of the singling apparatus. Singler 50 consists of suction head 51 and two diagonally disposed pairs of slides 52 and 53 which can be moved alternatingly in or out above the magazine.

For singling uppermost card 17, pair of slides 52 is first moved in above the magazine so that the protruding surfaces of following card 18 are covered. After that, the uppermost card 17 is gripped by suction head 51 and lifted vertically off the card stack.

If following card 18 should stick to uppermost card 17, its protruding surfaces push under slides 52 and card 18 is held back by them. Singled uppermost card 17 is then fed to a further-processing unit. For singling following card 18, slides 52 are then moved out and slides 53 moved in so that following card 18 is freely accessible.

The embodiments described up to now preferably use a suction head designed to act only on uppermost card 17 of card stack 16. If not only individual cards but several cards combined in a group are to be singled, it is advantageous to replace the suction head by a gripper which is in a position to grip and transport such a card group reliably.

Figure 9:
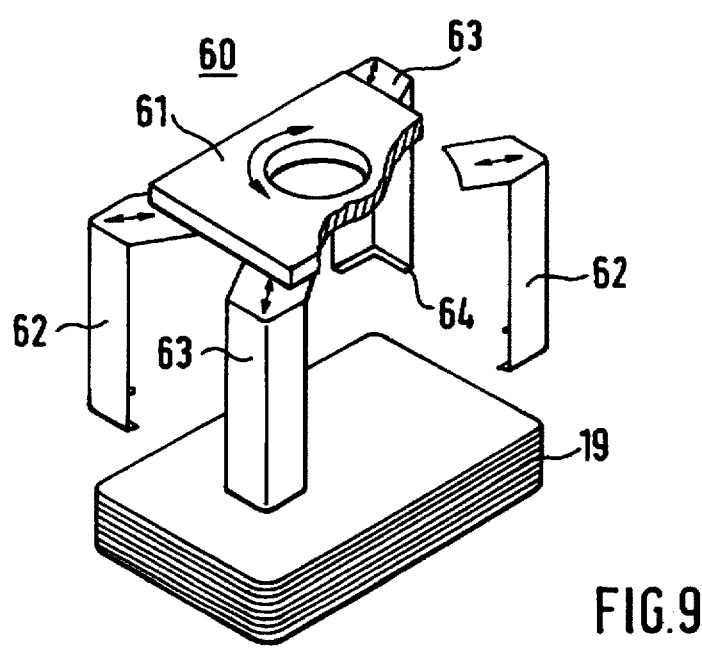
FIG. 9 shows the schematic representation of a gripper for stacks of packets.

FIG. 9 shows an embodiment of such a gripper 60. It consists of plate 61 and two pairs of grippers 62 and 63 which can be opened or closed alternatingly or jointly.

For gripping card group 19, both pairs of grippers 62 and 63 are first opened and the gripper lowered so far that gripper noses 64 are located below the card group. After that either one pair of grippers or both pairs of grippers are closed simultaneously and card group 19 removed from card stack 16.

The previously described embodiments of singlers can of course be used here too if the suction head is simply replaced by a suitable gripper. The dimensions of the gripper might cause space problems which can be eliminated by slight constructional changes in the particular embodiment of the singler. In the first embodiment, for example, the shape of aperture 34 can be changed by adding additional grooves so that a gripper in the open position can also be guided through the aperture.

As explained above, it is necessary for singling individual cards or card groups that they be rotated from one another in the card magazine. To obtain such an arrangement in a simple way it is advantageous to deposit the individual cards or card groups in an inventive magazine automatically by means of a suitable stacking apparatus.

In an embodiment of such a stacking apparatus not shown here, the cards or card groups are gripped by means of a movable, rotatable depositing device and brought into a position above the card magazine. The card is brought into the desired position for deposit by suitable rotation of the removing device, and can now be deposited vertically in the card magazine by the depositing device. Depositing devices used here can be e.g. rotatable suction heads or grippers as were described above.

Figure 10:
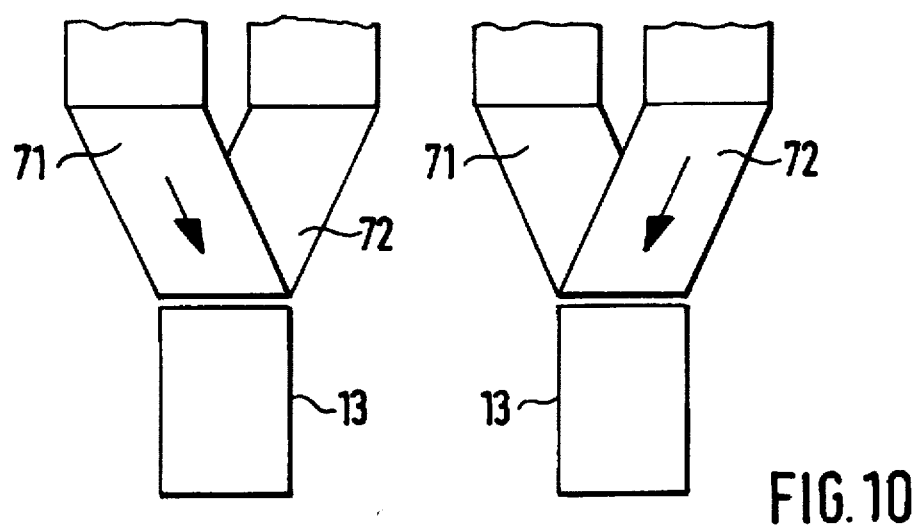
FIG. 10 shows the schematic representation of a transport path for filling the card magazine.

FIG. 10 shows an embodiment in which the cards are delivered to the apparatus on two transport paths 71 and 72. Transport paths 71 and 72 are at a defined angle to each other which corresponds to the particular angle of rotation of the cards in the card magazine. The cards can thus be introduced into the magazine directly from the particular transport path.

Figure 11:
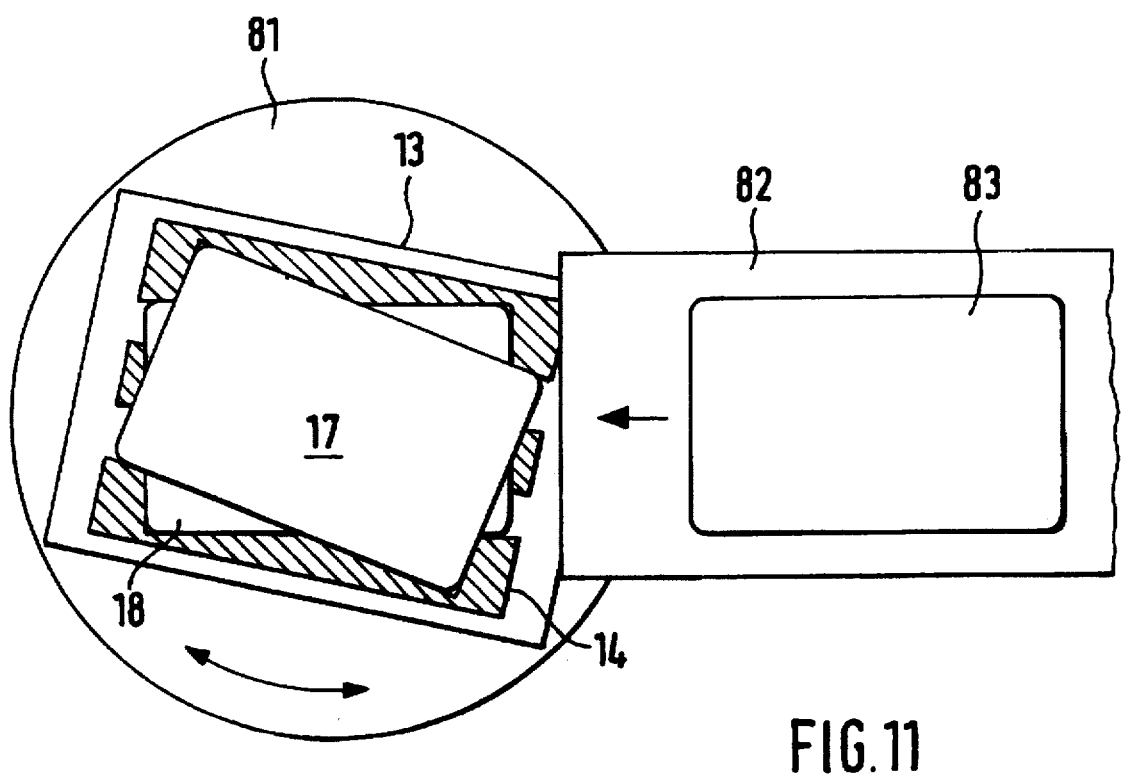
FIG. 11 shows the schematic representation of an embodiment for filling the card magazine with a turntable.

A further embodiment is shown in FIG. 11. Card magazine 10 is fastened to turntable 81. By suitable rotation of turntable 81 one can adjust the desired angle for depositing new card 83. Successive new cards 83 can thus be fed directly (in uniform orientation) to card magazine 10 by means of transport path 82.

We claim:

1. An apparatus for singling cards including groups of such cards, wherein the cards have generally planar opposed card surfaces defined by surface perimeters, the apparatus comprising:

a card magazine for supporting a stacked supply of cards to be singled with their surfaces adjacent one another, said magazine including a card orienting device for causing each successive card or card group to be retained in the magazine in relatively rotated positions about an axis extending perpendicular to their surfaces such that the card or card group surfaces are rotationally misaligned in the magazine leaving protruding card surfaces of cards or card groups in the magazine;

a card removing device including a card engaging device moveable in a direction substantially perpendicular to the surfaces of the cards, and including an actuator for moving the card engaging device in directions for approaching and removing an uppermost card or card group in the stacked supply of cards from the magazine in a direction perpendicular to a surface of the uppermost card or card group; and a card retaining device associated with the card magazine and the card removing device that includes means for interfering with removal of any card or card group following the uppermost card or card group by engagement with a protruding card surface of such following card or card group.

2. The apparatus of claim 1, wherein said means for interfering with removal of a card or card group following the uppermost card or card group includes a rotatable diaphragm located above the stacked supply of cards and having an aperture configured so as to correspond with the surface periphery of cards in the supply of cards, said card removing device being arranged to remove each card or card group from the magazine through said aperture.

3. The apparatus of claim 1, wherein said card retaining device comprises a rotatable bridge associated and moveable with the card engaging device, said bridge including an array of feet; said card engaging device being moveable relative to said array of feet for removing a card from said supply; said array of feet arranged such that at least a first foot of said array permits the uppermost card or card group to be engaged and removed by said card engaging device and at least a second foot of said array interferes with removal of a following card or card group by engagement with its protruding surface.

4. The apparatus of claim 1, wherein said retaining device comprises two opposed pair of slides extending diagonally relative to the card surfaces and moveable to positions for interfering with removal of any card or card group following the uppermost card or card group by engagement with its protruding surface.

5. The apparatus of claim 1, wherein said card engaging device comprises a suction head.

6. The apparatus of claim 1, wherein said card engaging device comprises a means for gripping a card or card group.

7. The apparatus of claim 1, wherein said card orienting device comprises a frame with recesses for receiving portions of card surface perimeters.

8. The apparatus of claim 1, wherein said card orienting device comprises an array of rods extending generally in the stacking direction of the stacked supply of cards.

9. The apparatus of claim 1, including card raising means for elevating said stacked supply of cards up to a preselected height, and means for controlling said raising means responsive to the uppermost card in said stacked supply reaching said preselected height.

10. The apparatus of claim 9, wherein said means for controlling said raising means comprises a pair of card presence sensor systems, one of said card presence sensor systems being arranged to detect an uppermost card located just above said preselected height and the other card presence sensor system being arranged to detect an uppermost card located just below said preselected height.

11. The apparatus according to claim 10, wherein said card presence sensor systems each comprises a light beam source and a light beam detector for detecting said light beam, and wherein the presence of a card between said light beam source and said light beam detector interrupts the light beam.

* * * * *